(12) United States Patent
Myers

(10) Patent No.: US 9,194,453 B2
(45) Date of Patent: Nov. 24, 2015

(54) GAS SPRING ASSEMBLY AND METHOD

(71) Applicant: Firestone Industrial Products Company, LLC, Indianapolis, IN (US)

(72) Inventor: James Richard Myers, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/042,215

(22) Filed: Sep. 30, 2013

(65) Prior Publication Data
US 2014/0091504 A1   Apr. 3, 2014

Related U.S. Application Data

(60) Provisional application No. 61/708,808, filed on Oct. 2, 2012.

(51) Int. Cl.
*F16F 9/04*  (2006.01)
*B60G 11/27*  (2006.01)
*F16F 9/05*  (2006.01)

(52) U.S. Cl.
CPC . *F16F 9/04* (2013.01); *B60G 11/27* (2013.01); *F16F 9/0445* (2013.01); *F16F 9/05* (2013.01); *B60G 2202/152* (2013.01)

(58) Field of Classification Search
CPC . B60G 11/27; B60G 2202/152; F16F 9/0445; F16F 9/05; F16F 9/04; F16F 9/0409; F16F 9/057
USPC .............. 267/35, 64.19, 64.21, 64.23, 64.24, 267/64.27, 118, 122
See application file for complete search history.

(56) References Cited

U.S. PATENT DOCUMENTS

| | | | | |
|---|---|---|---|---|
| 4,629,170 | A * | 12/1986 | Warmuth, II | 267/64.27 |
| 4,722,516 | A * | 2/1988 | Gregg | 267/64.27 |
| 4,741,517 | A * | 5/1988 | Warmuth et al. | 267/64.24 |
| 4,934,667 | A * | 6/1990 | Pees et al. | 267/64.21 |
| 6,386,524 | B1 * | 5/2002 | Levy et al. | 267/64.27 |
| 7,226,045 | B2 * | 6/2007 | Brookes | 267/64.27 |
| 8,474,798 | B2 * | 7/2013 | Jeischik | 267/64.24 |
| 8,800,975 | B2 * | 8/2014 | Moulik et al. | 267/64.24 |
| 2006/0208402 | A1 * | 9/2006 | Keeney et al. | 267/64.11 |
| 2011/0115139 | A1 * | 5/2011 | Moulik et al. | 267/64.23 |

* cited by examiner

*Primary Examiner* — Thomas J Williams
*Assistant Examiner* — Mariano Sy
(74) *Attorney, Agent, or Firm* — Jason A. Houser; Fay Sharpe LLP

(57) ABSTRACT

A gas spring assembly includes an unreinforced flexible wall formed from a polymeric material and an external reinforcing structure extending lengthwise along and around the periphery of the unreinforced flexible wall. The external reinforcing structure is capable of extending and collapsing together with corresponding extension and compression of the flexible wall. The gas spring assembly also includes opposing end members. The external reinforcing structure can be formed from a plurality of interconnecting wall segments that at least partially define a plurality of openings extending through the external reinforcing structure. A suspension system is also included.

17 Claims, 13 Drawing Sheets

GAS SPRING ASSEMBLY AND METHOD

This application claims priority from U.S. Provisional Patent Application No. 61/708,808 filed on Oct. 2, 2012, which is hereby incorporated herein by reference in its entirety.

BACKGROUND

The subject matter of the present disclosure broadly relates to the art of spring devices and, more particularly, to gas spring assemblies that include an unreinforced spring wall and an external reinforcing structure as well as methods of manufacturing the same.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

As is well known, it is possible to vary the spring rate of a gas spring assembly, by increasing or decreasing the volume of pressurized gas operatively associated with the spring chamber of the gas spring assembly. It is often considered desirable to utilize spring elements that operate at a lower relative spring rate, as such a reduced spring rate can favorably influence certain performance characteristics, such as vehicle ride quality and passenger comfort, for example. That is, it is well understood in the art that the use of a spring element having a higher spring rate (i.e. a stiffer or more-rigid spring) are likely to transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Conventional gas spring assemblies include opposing end members and a spring wall that is adapted to flex during dynamic operation and use of the gas spring assemblies. The spring wall is commonly made from a flexible, elastomeric material and the end members are normally comparatively rigid. During operation, the gas spring assemblies are loaded such that opposing forces act against the end members. It is well recognized in the art that the spring wall does not itself support the load. Rather, pressurized gas is retained within the gas spring assembly by the spring wall and acts against the end members to thereby provide forces capable of supporting loads applied to the end members.

To withstand the forces applied thereto by the aforementioned pressurized gas, existing spring walls generally include internal reinforcement in the form of additional materials and/or structures. Such internal reinforcement acts to buttress the elastomeric material of the spring wall and thereby helps to restrict the expansion of the same, both under internal design pressures and under dynamic pressure levels associated with use under load. For example, some known wall constructions include internal structures in the form of reinforcement filaments or cords that are embedded in the material from which the spring wall is constructed.

Notwithstanding the overall success and common usage of conventional gas spring constructions, certain areas of improvement in the art of gas spring devices still remain. Accordingly, it is believed desirable to develop gas spring assemblies and methods that overcome the foregoing and/or other disadvantageous qualities and/or characteristics associated with conventional gas spring constructions, and/or otherwise advance the art of gas spring devices.

BRIEF SUMMARY

One example of a gas spring assembly in accordance with the subject matter of the present disclosure can be capable of undergoing displacement between extended and compressed conditions. The gas spring assembly can include a flexible wall and an external reinforcing structure. The flexible wall can have a longitudinal axis and can extending peripherally about the axis and longitudinally between opposing first and second ends that can be displaceable relative to one another between extended and compressed conditions. The flexible wall can at least partially define a spring chamber that is inflatable by pressurized gas. The flexible wall can be free from internal reinforcement and can be substantially entirely formed from elastomeric material. The external reinforcing structure can extend peripherally about the axis and lengthwise between opposing first and second ends. The external reinforcing structure can be positioned along the flexible wall with the first end operatively connected to the first end of the flexible wall and the second end operatively connected to the second end of the flexible such that the first and second ends of the external reinforcing structure can move relative to one another as the first and second ends of the flexible wall are displaced between the extended and collapsed positions. The external reinforcing structure can be at least partially formed from a plurality of wall segments that at least partially define a plurality of openings extending through the reinforcing structure. The external reinforcing structure can be at least partially formed from a comparatively inelastic material relative to the flexible wall such that the external reinforcing structure is capable of resisting outward expansion of the flexible wall in an inflated condition thereof.

Another example of a gas spring assembly in accordance with the subject matter of the present disclosure can be dimensioned for securement between associated structural components and can be displaceable between extended and collapsed positions. The gas spring assembly can include an elongated flexible wall having a longitudinal axis and extending peripherally about the longitudinal axis and longitudinally between opposing first and second ends such that the flexible wall can at least partially define a spring chamber for retaining a quantity of pressurized gas. The flexible wall can be at least partially formed from a quantity of elastomeric material. A first end member can extend across the first end of the flexible wall and can be secured thereto in a substantially fluid-tight manner. A second end member can extend across the second end of the flexible wall and can be secured thereto in a substantially fluid-tight manner. An external reinforcing structure can extend peripherally about the axis and longitudinally between opposing first and second ends. The external reinforcing structure can be disposed peripherally around and longitudinally along the flexible wall with the first end operatively connected to the first end member and the second end operatively connected to the second end member. As such, the first and second ends of the external reinforcing structure can move relative to one another as the gas spring assembly undergoes displacement between the extended and collapsed positions. The external reinforcing structure can be at least partially formed from a plurality of wall segments that at least partially define a plurality of openings extending through the reinforcing structure. The external reinforcing structure can be at least partially formed from a comparatively inelastic material relative to the flexible wall such that the external reinforcing structure is capable of resisting outward expansion of the flexible wall in an inflated condition of the gas spring assembly.

A further example of a gas spring assembly in accordance with the subject matter of the present disclosure can be displaceable between extended and collapsed positions. The gas spring assembly can include a flexible wall having a longitudinal axis and extending peripherally about the axis and longitudinally between opposing first and second ends. The flexible wall can at least partially define a spring chamber. The flexible wall can be free from internal reinforcement and can be substantially entirely formed from a quantity of elastomeric material. A first end member can be secured across the first end of the flexible wall in a substantially fluid-tight manner. A second end member can be secured across the second end of the flexible wall in a substantially fluid-tight manner. An external reinforcing structure can extend peripherally about the axis and longitudinally between opposing first and second ends. The external reinforcing structure can be positioned along the flexible wall with the first end operatively connected to the first end member and the second end operatively connected to the second end member. As such, the external reinforcing structure can extend and collapse as the gas spring assembly undergoes displacement between the extended and collapsed positions. The external reinforcing structure can be at least partially formed from a comparatively inelastic material relative to the flexible wall such that the external reinforcing structure is capable of resisting outward expansion of the flexible wall in an inflated condition of the gas spring assembly.

One example of a suspension system in accordance with the subject matter of the present disclosure can include can include at least one gas spring assembly according to any one of the three foregoing paragraphs. The suspension system can also include one or more pressurized gas systems in fluid communication with the one or more gas spring assemblies.

DETAILED DESCRIPTION

Figure 1:
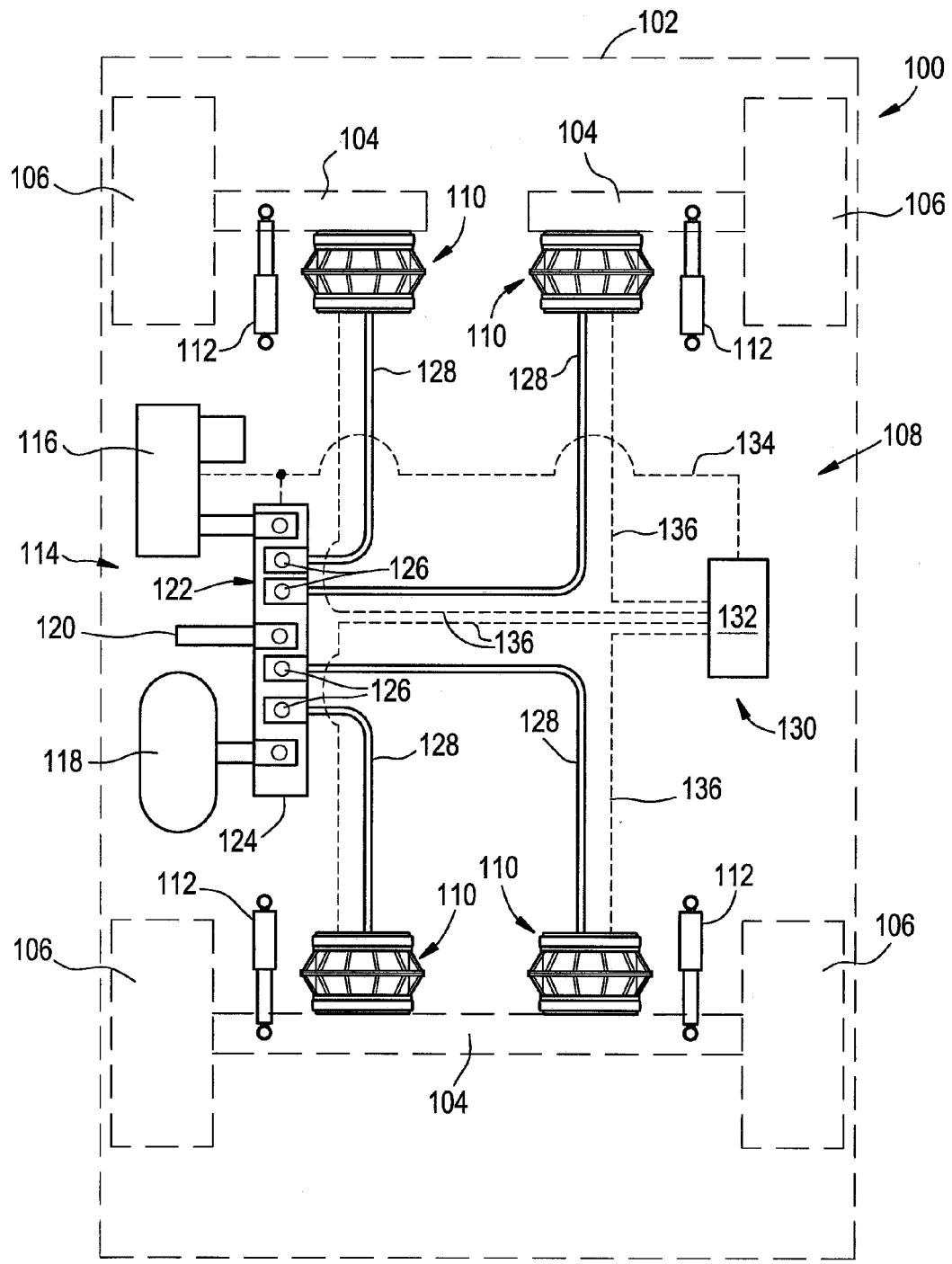
FIG. 1 is a schematic representation of one example of a vehicle including a suspension system utilizing gas spring assemblies in accordance with the subject matter of the present disclosure.
Figure 2:
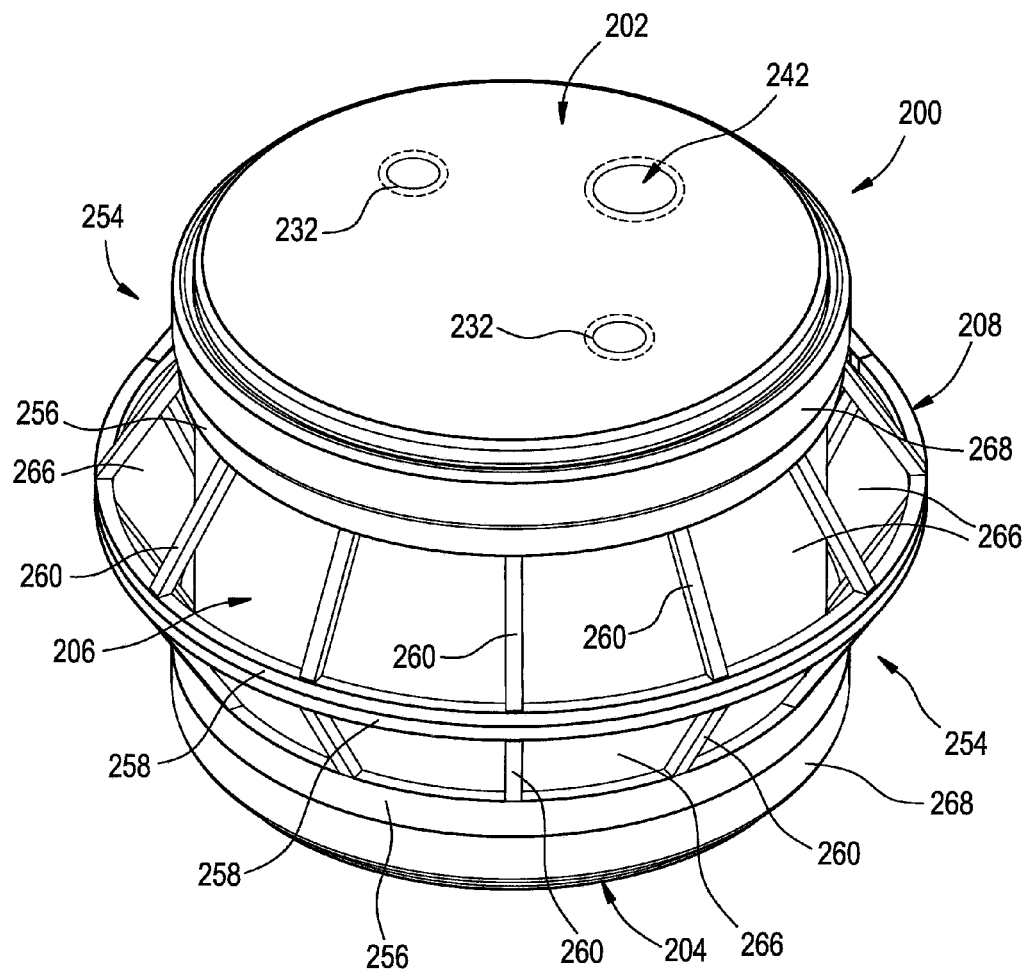
FIG. 2 is a top perspective view of one example of a gas spring assembly in accordance with the subject matter of the present disclosure.
Figure 3:
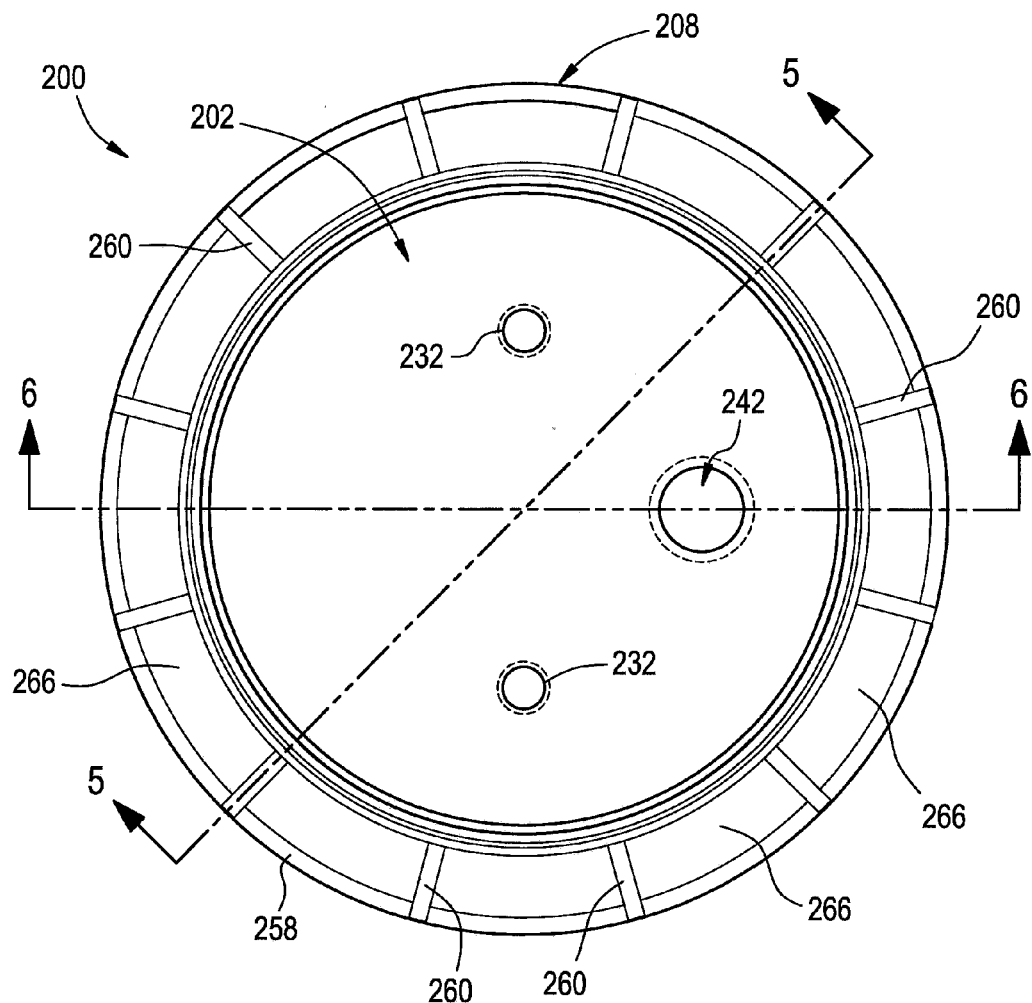
FIG. 3 is a top plan view of the exemplary gas spring assembly shown in FIG. 2.

The term "elastic limit," as used herein, is to be interpreted to mean the limit of distortion that a material can undergo and still return to its original form when relieved from stress.

Terms including "non-rigid," "compliant," "elastic," "elastomeric" and the like, as used herein, are to be interpreted to encompass any material that has an elongation at its elastic limit of greater than approximately 25 percent, and preferably has an elongation at its elastic limit of greater than approximately 40 percent. Exemplary "compliant" materials can include natural rubber, synthetic rubber and thermoplastic elastomers, such as polyurethane, for example.

Terms including "inelastic," "low stretch," "low elongation" and the like, as used herein, are to be interpreted to encompass any material that has an elongation at its elastic limit of less than approximately 25 percent and, commonly has an elongation at its elastic limit of less than approximately 10 percent.

Terms including "reinforce," "reinforced," "reinforcing" and the like, as used herein, are to be interpreted as referring to the use of one or more elements, structures and/or components to restrain or limit the expansion of an elastomeric spring wall being subjected to pressurized gas.

Terms such as "internal reinforcement," "internally reinforced" and the like, as used herein, are to be interpreted as referring to the use of substantially inelastic filaments (e.g., fibers, strands, yarns and threads) and/or plies of fabric, or other sections of material made therefrom that are embedded within a flexible wall formed from an elastomeric material to help restrict or otherwise limit the expansion thereof. Exemplary "substantially inelastic filaments" include cotton yarns, nylon cords and aramid fibers.

Terms such as "external reinforcement," "externally reinforced" and the like, as used herein, are to be interpreted as referring to the use of one or more additional structures and/or components that are assembled onto or otherwise disposed along an elastomeric spring wall, generally after the manufacture thereof, which restrict or otherwise limit the radially outward expansion of the elastomeric spring wall during use thereof.

Terms including "unreinforced," "without reinforcement" and the like, as used herein, are to be interpreted as broadly referring to an elastomeric spring wall that is capable of operation and use under conditions typically associated with known gas spring assemblies, though without the elastomeric spring wall including or otherwise using any internal reinforcement or other substantially inelastic filaments embedded therein.

Terms including "stiff," "stiffness" and the like, as used herein, are to be interpreted as referring to a measure of resistance to elongation and/or bending of a wall or other structural feature. One measure of stiffness, as referred to herein, can include axial stiffness, such as may be associated with flexural modulus, for example. Another measure of stiffness can include radial stiffness, which may also be referred to herein as hoop stiffness or hoop strength. Additionally, the term stiffness can include any combination of axial stiffness, radial stiffness and/or any other measure of stiffness. As one example, the term stiffness could refer to a measure of stiffness approximated by the following equation:

$$ST_{TOT} = \frac{A \times ST_{RAD} + B \times ST_{AX} + C \times ST_{OTH}}{100}$$

where $ST_{TOT}$ is the overall stiffness of the relevant feature or wall portion, $ST_{RAD}$ is the numerical component or portion of the overall stiffness in the radial direction, $ST_{AX}$ is the numerical component or portion of the overall stiffness in the axial direction, $ST_{OTH}$ can be any other measure, numerical composition or portion of the overall stiffness, A is a first variable having a value within a range of from approximately 0 to approximately 100, B is a second variable having a value within a range of from approximately 0 to approximately 100, and C is a third variable having a value within a range of from approximately 0 to approximately 100.

Additionally, stiffness can range from a minimally resistive condition having a substantially low resistance to elongation and/or bending to a more resistive condition with an increased resistance to elongation and/or bending. The minimally resistive condition being referred to herein as having a "lower stiffness" and the more resistive condition being referred to herein as having a "higher stiffness." In a preferred embodiment, a wall portion or other structural feature having a "lower stiffness" could be formed from an elastomeric material having a flexural modulus of less than approximately 15,000 psi. And, in this preferred arrangement, a wall portion or other structural feature having a "higher stiffness" could be formed from an elastomeric material having a flexural modulus of greater than 15,000 psi, and preferably greater than 30,000 psi.

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members 112 of a typical construction (e.g., conventional struts and/or shock absorbers) that are provided separately from assemblies 110 and secured between the sprung and unsprung masses in a conventional manner.

Vehicle 100 also includes a pressurized gas system 114 that is in communication with assemblies 110 and that is operative to selectively supply pressurized gas thereto and exhaust pressurized gas therefrom. Pressurized gas system 114 can include a pressurized gas source, such as a compressor 116, and can optionally include a storage vessel, such as a reservoir 118, for example, for receiving and storing pressurized gas, such as may be generated by the pressurized gas source. System 114 can further include a suitable exhaust, such as a muffler 120, for example, for venting pressurized gas from the system.

Pressurized gas system 114 can be in communication with the gas spring and gas damper assemblies in any suitable manner. For example, system 114 can include a valve assembly 122 or other suitable control device or arrangement for selectively distributing pressurized gas to, from and/or between the pressurized gas source or sources, the exhaust and/or the gas spring assemblies. As one example, valve assembly 122 can include a valve body 124 and a plurality of valves 126 that are selectively operable to place corresponding ports (not shown) of valve body 124 in fluid communication with one another. As shown in the exemplary embodiment in FIG. 1, compressor 116, reservoir 118 and muffler 120 are in fluid communication with valve assembly 122 and can be selectively placed in fluid communication with one another by way of the valve assembly. Additionally, assemblies 110 are in fluid communication with valve assembly 122 by way of gas transmission lines 128 and, thus, can be selectively placed in communication with the compressor, reservoir, muffler and/or one another by way of the valve assembly.

In operation of the exemplary embodiment shown in FIG. 1, valve assembly 122 can be selectively actuated to transfer pressurized gas from the compressor and/or reservoir to one or more of gas spring assemblies 110 via one or more of gas transmission lines 128. Additionally, valve assembly 122 can be selectively actuated to exhaust pressurized gas from one or more of the gas spring assemblies through the gas transmission lines, such as by way of muffler 120 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a control system 130 for selectively operating, adjusting or otherwise influencing or controlling the performance or one or more suspension system components, such as gas spring assemblies 110 and/or pressurized gas system 114, for example. Control system 130 can include an electronic control unit 132 in communication with one or more components of valve assembly 122, such as through a communication line 134, for example, for selective actuation and/or operation thereof. Electronic control unit 132 is also shown in FIG. 1 as being in communication with suitable height sensing devices (not shown) that can optionally be used in association with gas spring assemblies 110. It will be appreciated that such communications can be implemented in any suitable manner, such as by way of communication lines 136, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 130, such as pressure sensors, accelerometers and/or temperature sensors, for example.

A gas spring assembly in accordance with the subject matter of the present disclosure can include two end members that are spaced apart from one another with an unreinforced flexible wall secured therebetween that at least partially defines a spring chamber. An external reinforcing structure can be secured between the two end members and can assist in restraining outward expansion of the flexible wall in an inflated condition of the gas spring assembly. The external reinforcing structure can extend along the full length and around the full periphery of the flexible wall. In some cases, the external reinforcing structure can be formed from a plurality of interconnecting wall segments that together at least partially formed a cage, web or screen-like structure extending at least partially along and at least partially around the flexible wall. In this manner, the external reinforcing structure can extend and compress together with the extension and compression of the gas spring assembly.

One example of a gas spring assembly 200 in accordance with the subject matter of the present disclosure, such as may be suitable for use as assemblies 110 in FIG. 1, for example, is shown in FIGS. 2-6. Gas spring assembly 200 has a longitudinally-extending axis AX (FIGS. 5 and 6) and includes end members 202 and 204, which can, for example, take the form of end caps, top caps, bead plates, rolling-lobe pistons and/or other constructions in any combination that are spaced longitudinally from one another. Gas spring assembly 200 also includes a flexible wall or spring member 206 and an external reinforcing structure 208. Flexible spring member 206 is secured between end members 202 and 204 and at least partially defines a spring chamber 210 therebetween. External reinforcing structure 208 extends peripherally about flexible spring member 206 and assists in restraining outward expansion of flexible spring member 206 upon inflation and during operation and use of gas spring assembly 200.

End members 202 and 204 can be of any suitable type, kind, configuration and/or construction. In some cases, one or more end members of the type commonly referred to as a bead plate and/or of the type commonly referred to as a piston or roll-off piston could be used. In the exemplary arrangements shown in FIGS. 1-6, however, end members 202 and 204 are shown as being of the type commonly referred to as end caps or top caps, and are shown as being substantially identical to one another. It will be recognized and understood, however, that end members of any other type, kind, configuration and/or construction, in any combination, could alternately be used.

Figure 5:
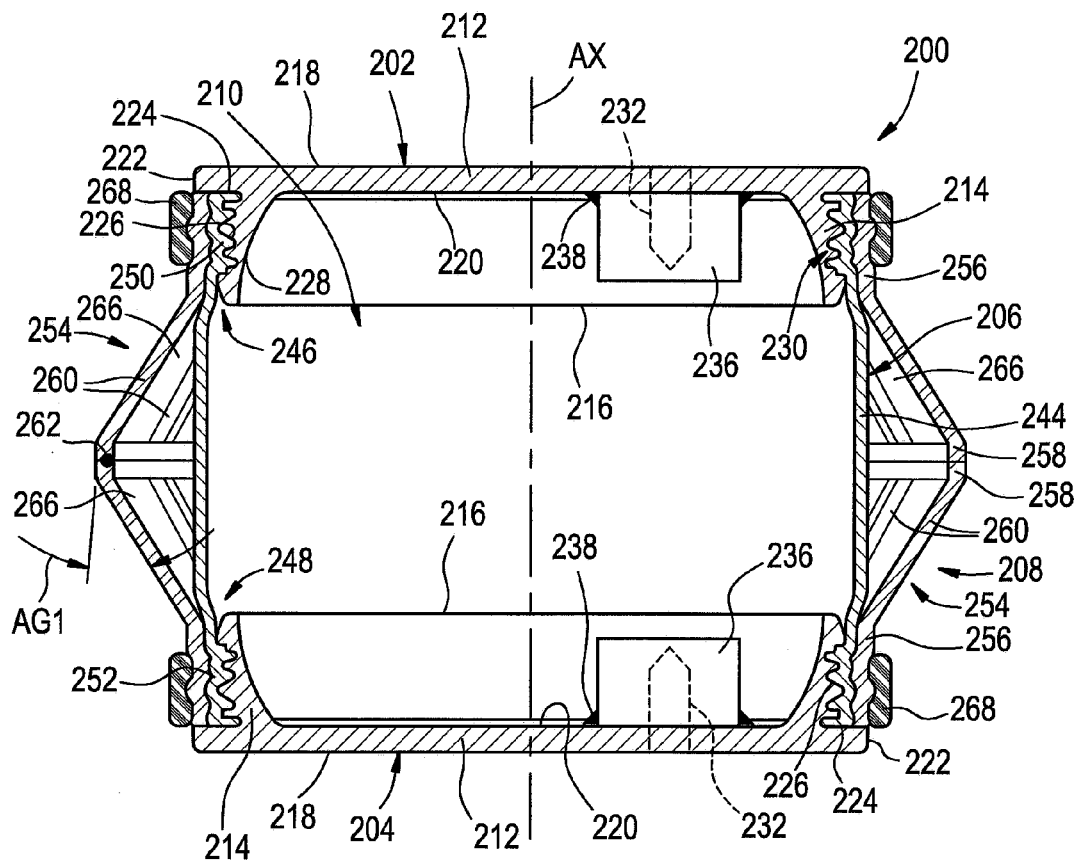
FIG. 5 is a cross-sectional side view of the exemplary gas spring assembly shown in FIGS. 2-4 taken from along line 5-5 in FIG. 3 and shown in an uninflated condition.

As identified in FIG. 5, end members 202 and 204 are shown as including an end wall portion 212 and a side wall portion 214 that projects axially from end wall portion 212 toward a distal edge 216 that is spaced longitudinally from end wall portion 212. End wall portion 212 is shown as including a surface 218 disposed along the exterior of the end members and a surface 220 disposed opposite surface 218 and at least partially defining spring chamber 210. End wall portion 212 also includes an outer peripheral edge 222 and a shoulder surface 224 opposite surface 218. Side wall portion 214 extends peripherally about axis AX adjacent outer peripheral edge 222, and includes surfaces 226 and 228 with surface 226 facing radially outward and surface 228 facing radial inwardly toward spring chamber 210. In some cases, side wall portion 214 can include one or more interengagement features 230 dimensioned to engage and at least partially retain at least a portion of flexible spring member 206 on or along the end member. In the arrangement shown, interengagement features 230 include a plurality of grooves that are disposed in longitudinally-spaced relation to one another along surface 226 and extend at least partially around the end members. In some cases, the one or more interengagement features can take the form of one or more endless, annular grooves. It will be appreciated, however, that other configurations and/or arrangements could alternately be used.

Figure 4:
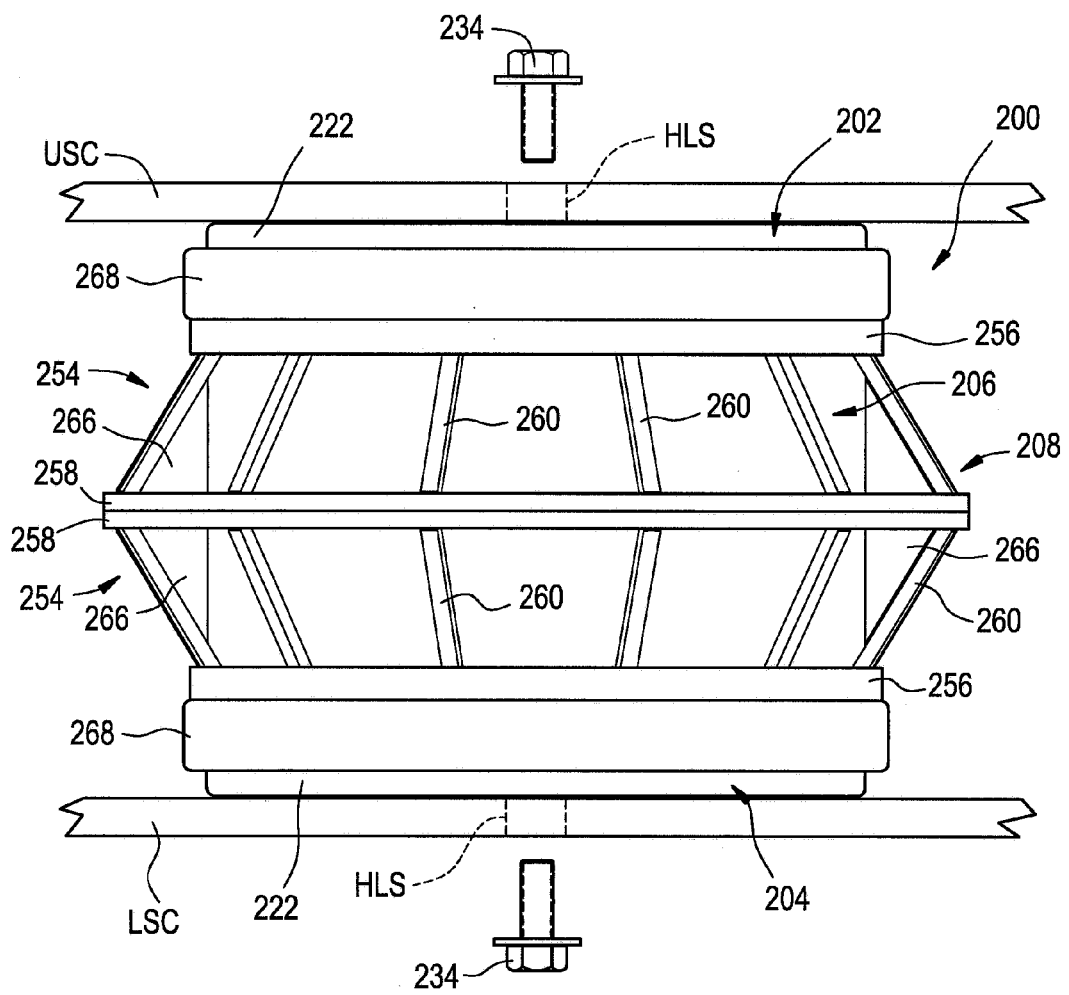
FIG. 4 is a side elevation view of the exemplary gas spring assembly shown in FIGS. 2 and 3.

It will be appreciated that gas spring assembly 200 can be secured on, along or otherwise between associated structural components in any suitable manner and through the use of any number of one or more components and/or devices. As one example, gas spring assembly 200 is shown in FIG. 4 as being disposed between a first or upper structural component USC, such as an associated body 102 of vehicle 100 in FIG. 1, for example, and a second or lower structural component LSC, such as an associated axle 104 of the vehicle 100 in FIG. 1, for example. In some cases, end members 202 and/or 204 can, optionally, include one or more securement features formed therein, such as one or more threaded passages 232, for example, that are dimensioned to receivingly engage a corresponding one or more securement devices, such as one or more threaded fasteners 234, for example. In some cases, one or more holes HLS can extend through upper structural component USC and/or lower structural component LSC. In such cases, the one or more holes can be disposed in approximate alignment with a corresponding one of threaded passages 232 and dimensioned for receipt of one of threaded fasteners 234. It will be appreciated, however, that other configurations and/or arrangements could alternately be used.

Figure 6:
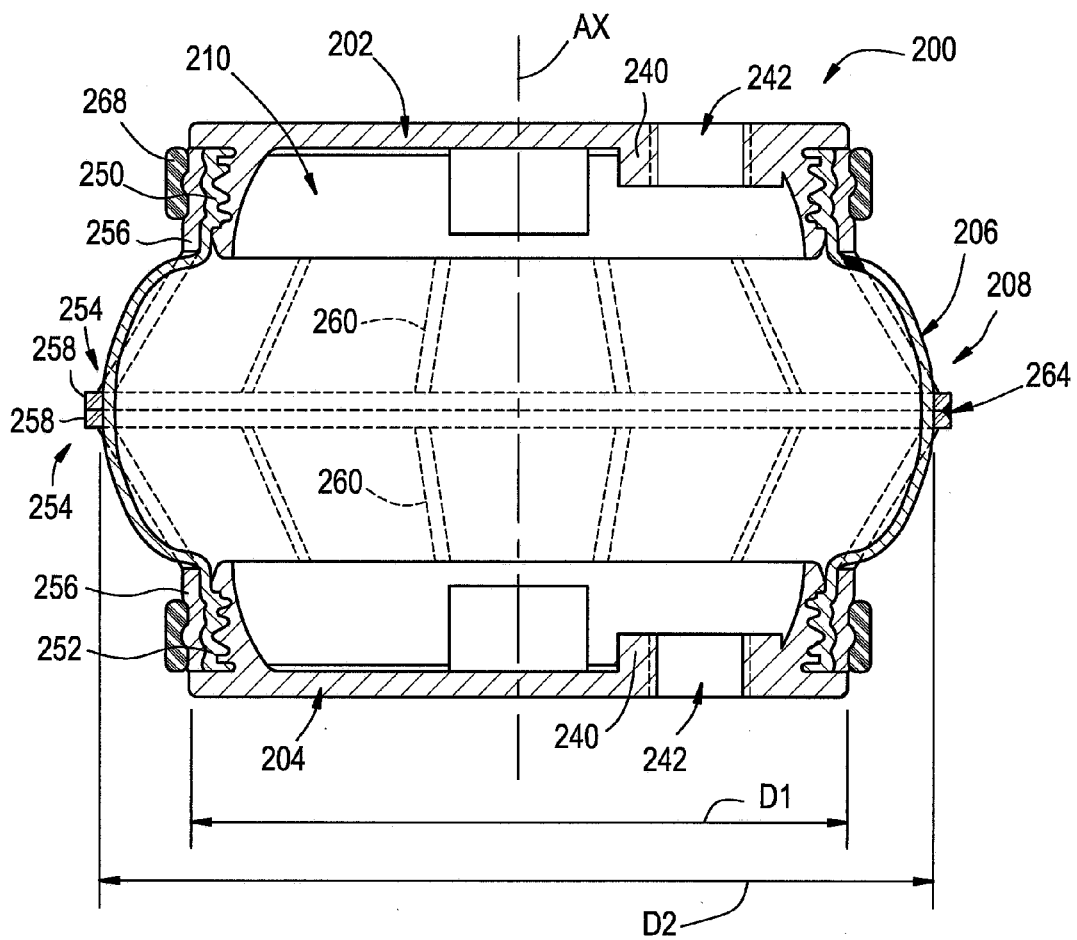
FIG. 6 is a cross-sectional side view of the exemplary gas spring assembly in FIGS. 2-5 taken from along line 6-6 in FIG. 3 and shown in an inflated condition.

Additionally, end members 202 and/or 204 can, optionally include any number of one or more additional features, components and/or elements. For example, end members 202 and 204 are shown in FIGS. 5 and 6 as including bosses 236 that are disposed along surfaces 220 and are secured to end wall portion 212 in a substantially fluid tight manner, such as by way of a flowed-material joint 238, for example. Threaded passages 232 are shown as extending through end wall portion 212 and into bosses 236. As another example, end members 202 and 204 are shown in FIGS. 5 and 6 as including passage walls 240 that at least partially define a transfer passage 242 adapted to receive and threadably engage an associated connector fitting (not shown), such as may be suitable for forming a substantially fluid tight connection with one of gas transmission lines 128 in FIG. 1, for example.

Flexible spring member 206 is shown as including a flexible wall 244 that extends peripherally about axis AX and extends lengthwise between opposing, longitudinally-spaced ends 246 and 248. It will be appreciated that flexible spring member 206 can be of any suitable configuration and/or construction, and can be secured on or along the end member of the gas spring assembly in any suitable manner. For example, the flexible spring member could include ends formed by a portion of the flexible wall material that extend along at least a portion of an end member (e.g., along side wall portion 214) and are secured thereto by way of a retaining ring that can be crimped or otherwise radially-inwardly deformed into abutting engagement with the portion of the flexible wall.

For example, flexible wall 244 can take the form of an elongated sleeve that has ends formed by the flexible wall material. In some cases, one or more additional features, plies or layers can be included along one or more of the ends, such as may be suitable for operative connection with interengagement features 230 of end members 202 and/or 204, for example. Additionally, flexible wall 244 can be formed from any suitable material or combination of materials, such as one or more of a natural rubber, a synthetic rubber and/or a thermoplastic elastomer (e.g., polyurethane). In a preferred arrangement, flexible wall 244 is formed from one or more layers or plies of unreinforced elastomeric material, and includes wall portions 250 and 252 that are disposed along side wall portions 214 of end members 202 and 204.

As described above, an external reinforcing structure in accordance with the subject matter of the present disclosure can extend at least partially around the flexible spring member and assist in restraining outward expansion of the flexible wall thereof in an inflated condition of the gas spring assembly. In a preferred arrangement, the external reinforcing structure can extend along the full length and around the full periphery of the flexible wall. In some cases, the external reinforcing structure can be formed from a plurality of interconnecting wall segments that together at least partially formed a cage, web or screen-like structure having a plurality of openings formed by the interconnecting wall segments. The external reinforcing structure can extend at least partially along and at least partially around the flexible wall. In this manner, the external reinforcing structure can undergo axial and/or lateral displacement as the flexible spring member and the gas spring assembly are extended and compressed, such as may occur during use in operation, for example.

As one example of a suitable construction, external reinforcing structure 208 can include one or more structure sections 254 of which two are shown in FIGS. 1-6. It will be appreciated, however, that an alternate construction could be used in which a single structure section is formed from a plurality of interconnecting wall segments and/or wall sections. In the arrangement shown, structure sections 254 each include a mounting wall segment 256 and a connector wall segment 258 that is spaced axially from mounting wall segment 256. In the arrangement shown in FIGS. 1-6, mounting wall segments 256 and connector walls segments 258 take the form of annular rings. It will be appreciated, however, that other shapes and/or configurations could alternately be used. Additionally, mounting wall segments 256 are shown as having an outermost cross-sectional dimension, which is represented in FIG. 6 by reference dimension D1, and connector walls segments 258 are shown as having an innermost cross-sectional dimension, which is represented in FIG. 6 by reference dimension D2, that is greater than the outermost cross-sectional dimension of the mounting wall segments.

Structure sections 254 also include a plurality of web or bridge wall segments 260 that extend outwardly from mounting wall segment 256 to connector wall segment 258. The plurality of bridge wall segments are spaced peripherally around structure sections 254 and can be disposed in any suitable orientation, configuration and/or arrangement, such as by being approximately evenly spaced from one another, for example. Additionally, the plurality of bridge wall segments can be of any suitable size, shape and/or configuration. For example, bridge wall segments 260 are shown as extending approximately linearly from mounting wall segment 256 to connector wall segment 258 and as being oriented in approximate alignment with axis AX. Given the difference in dimensions D1 and D2, it will be appreciated that bridge wall segments 260 extend from a mounting wall segment 256 outwardly at an angle relative to axis AX, such as is represented in FIG. 5 by reference dimension AG1.

An external reinforcing structure in accordance with the subject matter of the present disclosure, such as external reinforcing structure 208, for example, preferably has a comparatively rigid construction relative to the stiffness of the associated flexible spring member (e.g., flexible spring member 206). In a preferred arrangement, however, the external reinforcing structure will be capable of undergoing axial and/or lateral displacement together with the flexible spring member and the gas spring assembly as a whole. In some cases, the external reinforcing structure can be formed from a material or combination of materials that are comparatively rigid relative to the material from which the flexible spring member is formed. Preferably, however, the material of the external reinforcing structure can remain sufficiently flexible to permit the desired displacement without contributing a substantially increased stiffness to the gas spring assembly.

As such, it will be appreciated that the materials of the flexible spring member and the external reinforcing structure can include any combination of two or more different materials, two or more compounds of similar materials, or two or more grades of the same material. As indicated above, non-examples of suitable compliant materials from which the flexible spring member can be formed can include any combination of one or more natural rubber, synthetic rubber and/or thermoplastic elastomer (e.g., flexible grades of polyurethane). Non-limiting examples of materials from which the external reinforcing structure can be formed can include comparatively rigid or otherwise substantially inelastic thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

In some cases, a living hinge or other flexible joint, which is represented by element 262 in FIG. 5, can be formed between adjacent connector walls segments 258. It will be appreciated, however, that other configurations and/or arrangements could alternately be used. As one alternate example, a flowed-material joint could be used to secure the adjacent connector walls segments in abutting engagement with one another, as is represented by joint element 264 in FIG. 6, for example.

Additionally, it will be appreciated that the relative size and arrangement of mounting wall segments 256, connecting wall segments 258 and bridge wall segments 260, as shown in FIGS. 1-6, can result in the formation of a plurality of openings 266 that extend through structure sections 254 of external reinforcing structure 208. As shown in FIG. 6, openings 266 permit controlled expansion of flexible spring member 206 in an inflated condition and during certain conditions of use, such as during jounce conditions, for example. In some cases, portions of flexible wall 244 can expand outwardly beyond external reinforcing structure 208, such as through openings 266, for example.

As indicated above, it will be appreciated that the external reinforcing structure can be secured on or along one or more components of the gas spring assembly and/or an associated structural component in any suitable manner. In the arrangement shown in FIGS. 1-6, external reinforcing structure 208 is disposed between end members 202 and 204, and mounting wall segments 256 are disposed in abutting engagement with wall portions 250 and 252 of flexible wall 244. The mounting wall segments and wall portions of the flexible wall are secured in abutting engagement along side wall portion 214 of end members 202 and 204 by way of retaining rings 268. In the arrangement shown, retaining rings 268 can be crimped or otherwise inwardly deformed to compressively engage the mounting wall segments and the wall portions of the flexible wall.

Figure 6A:
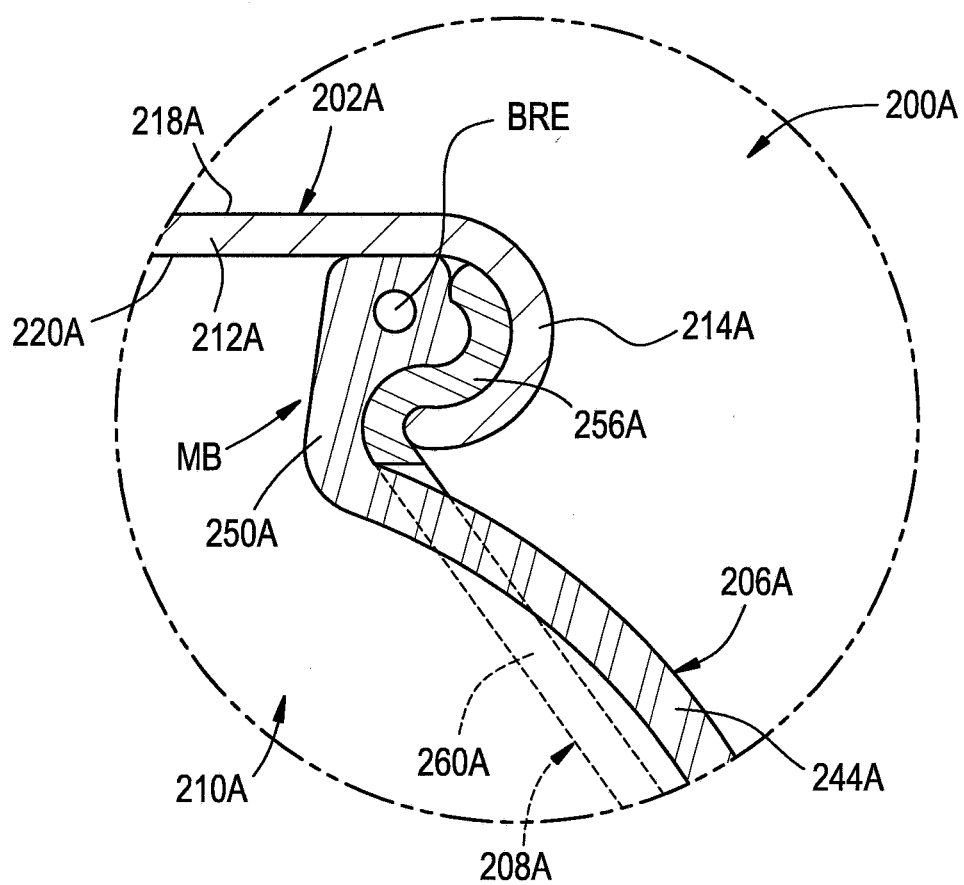
FIG. 6A is an enlarged cross-sectional side view of a portion of an alternate construction of the gas spring assembly shown in FIGS. 2-6.

An example of an alternate construction of a gas spring assembly in accordance with the subject matter of the present disclosure is shown in FIG. 6A. As non-limiting examples, such an alternate construction could be utilized in connection with one or more of the gas spring assemblies shown and described herein, such as along one or both ends of gas spring assembly 110, 200 and/or gas spring assembly 300, which is described in detail hereinafter. FIG. 6A illustrates an alternate construction of one or both ends of a gas spring assembly 200A, which includes an end member 202A in the form of a bead plate. End member 202A includes an end wall portion 212A and an outer peripheral wall portion 214A as well as a surface 218A disposed along the exterior of the gas spring assembly and a surface 220A disposed toward the interior of the gas spring assembly that at least partially defines a spring chamber 210A.

A flexible spring member 206A can include a flexible wall 244A with a wall portion 250A disposed along one end. The flexible spring member can, optionally, include one or more mounting beads MB formed along an end of the flexible wall, such as adjacent wall portion 250A, for example. In some cases, mounting beads MB can, optionally, include an annular reinforcing element that is at least partially embedded therein and provides structure such that a robust and substantially fluid-tight connection with the end member can be created and maintained. If provided, such a bead reinforcing element BRE can take any suitable form, such as a polymeric ring or a wound or twisted metal wire ring, for example. In such cases, the one or more mounting beads could be captured on or along the end member, such as by a crimped connection formed by outer peripheral wall portion 214A of end member 202A, for example.

Additionally, as discussed above in connection with gas spring assembly 200, gas spring assembly 200A can include an external reinforcing structure 208A that extends peripherally about flexible spring member 206A and assists in restraining outward expansion of flexible spring member 206A upon inflation and during operation and use of gas spring assembly 200A. The external reinforcing structure can include one or more mounting wall segments 256A, and plurality of bridge wall segments 260A that extend outwardly from mounting wall segment 256A. In some cases, on or more connector wall segments (e.g., connector wall segments 258) can also be included. As mentioned above, the external reinforcing structure(s) can be secured on or along one or more components of the gas spring assembly in any suitable manner. As one example, a portion of mounting wall segment 256A can be captured along the crimped connection between outer peripheral wall portion 214A and mounting bead MB. It will be appreciated, however, that other configurations and/or arrangements could alternately be used.

Another example of a gas spring assembly 300 in accordance with the subject matter of the present disclosure, such as may be suitable for use as one or more of assemblies 110 in FIG. 1, for example, is shown in FIGS. 7-11. Gas spring assembly 300 has a longitudinally-extending axis AX (FIG. 10) and includes end members 302 and 304. Gas spring assembly 300 also includes a flexible spring member 306 and an external reinforcing structure 308. Flexible spring member 306 is secured between end members 302 and 304 and at least partially defines a spring chamber 310 therebetween. It will be appreciated that flexible spring member 306 and/or external reinforcing structure 308 can be secured on or along end members 302 and 304 in any suitable manner, such as by way of retaining rings 312 and 314 that can be crimped or otherwise inwardly deformed to secure opposing ends of the flexible spring member on or along end members 302 and 304, respectively. Alternately, an arrangement such as has been described above in connection with FIG. 6A or is described hereinafter in connection with FIG. 12 could alternately be used.

It will be appreciated that end members 302 and 304 can be of any suitable type, kind, configuration and/or construction. In the arrangement shown in FIGS. 7-11, end member 302 is of a type commonly referred to as an end cap or top cap, and end member 304 is of a type commonly referred to as a piston or roll-off piston. As such, flexible spring member 306 is of a type commonly referred to as an elongated sleeve capable of forming a rolling lobe 316 (FIG. 11) on or along an outer surface 318 of end member 304. It will be appreciated, however, that other configurations and/or arrangements could alternately be used.

Figure 7:
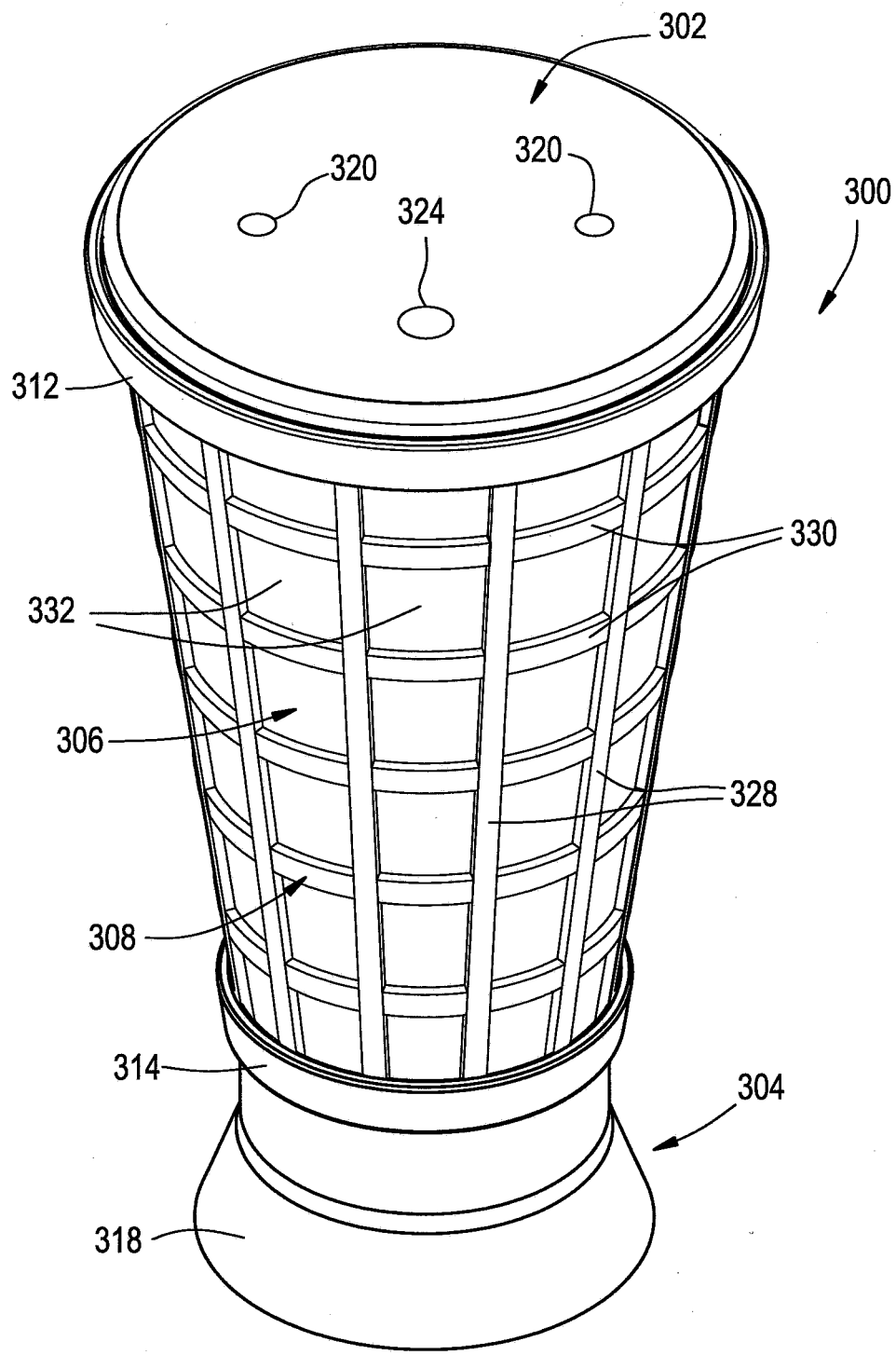
FIG. 7 is a top perspective view of another example of a gas spring assembly in accordance with the subject matter of the present disclosure with the gas spring assembly shown in a fully extended condition.
Figure 8:
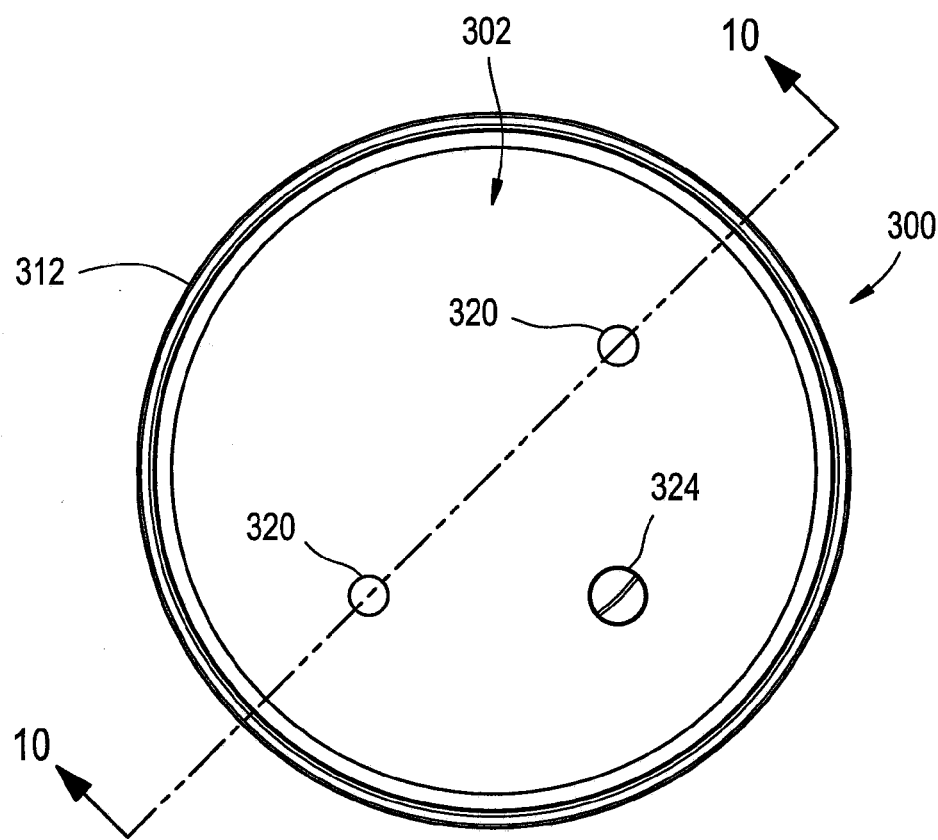
FIG. 8 is a top plan view of the exemplary gas spring assembly shown in FIG. 7.
Figure 9:
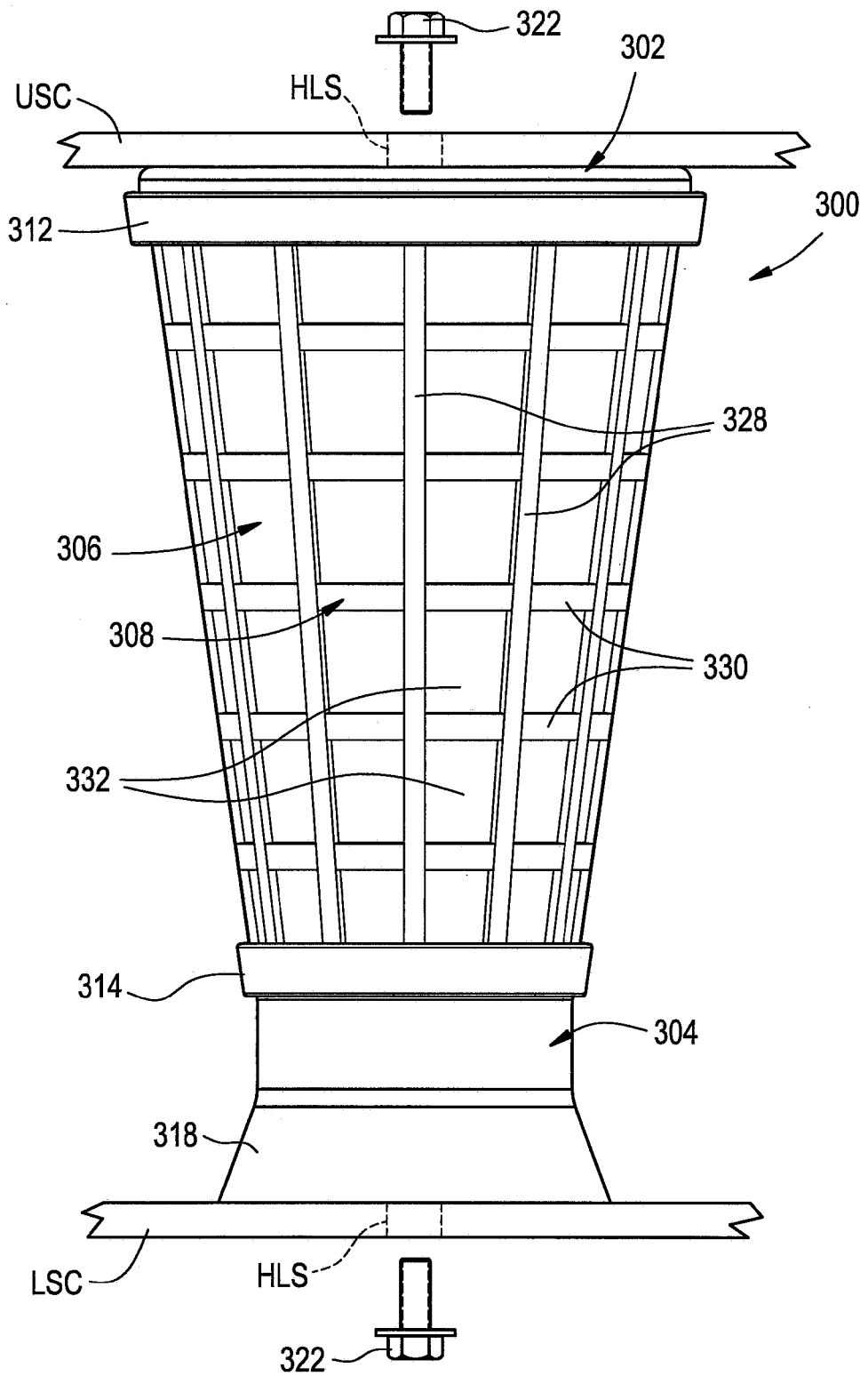
FIG. 9 is a side elevation view of the exemplary gas spring assembly in FIGS. 7 and 8 shown in the fully extended condition.
Figure 10:
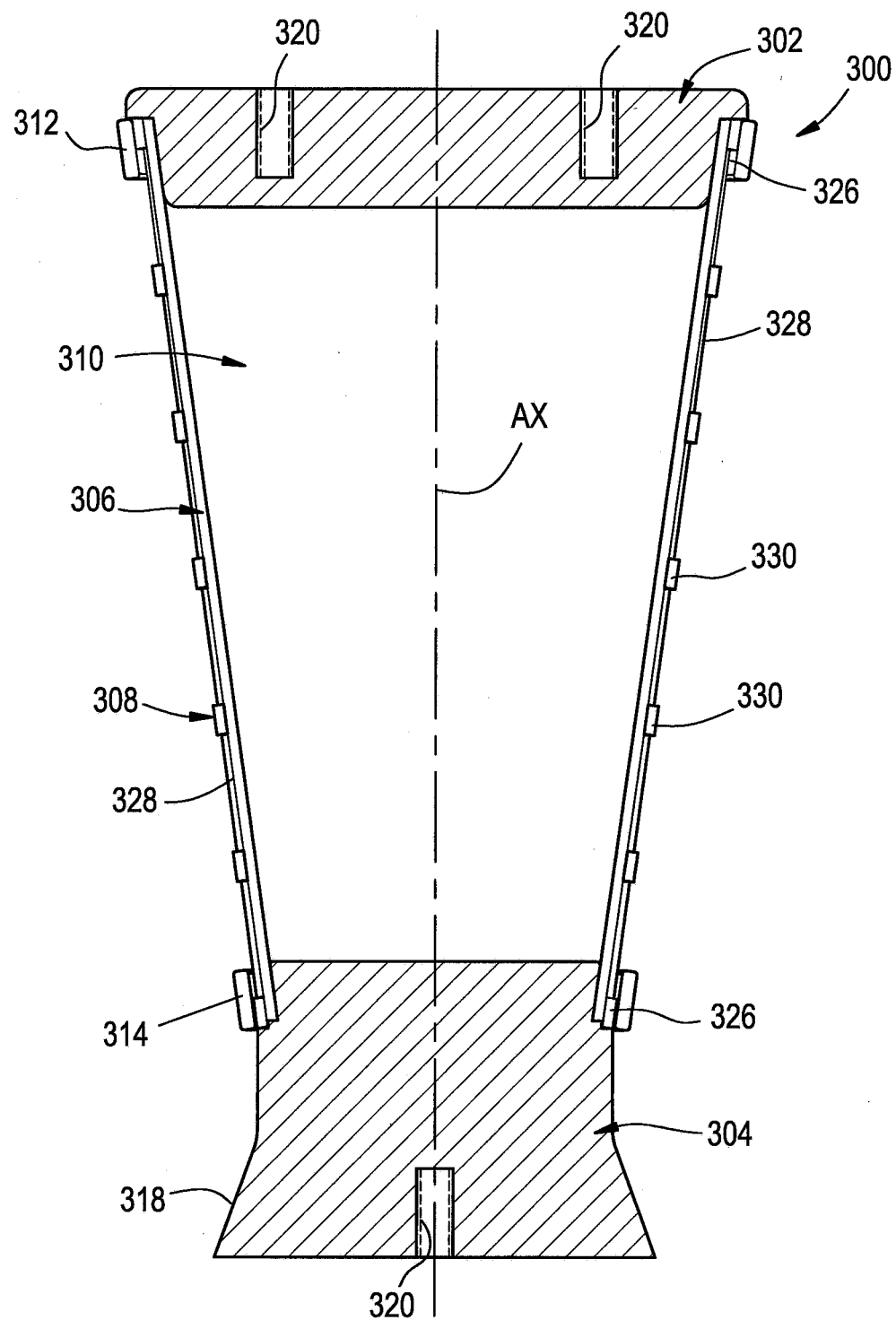
FIG. 10 is a cross-sectional side view of the exemplary gas spring assembly in FIGS. 7-9 taken from along line 10-10 in FIG. 8 and shown in the fully extended condition.
Figure 11:
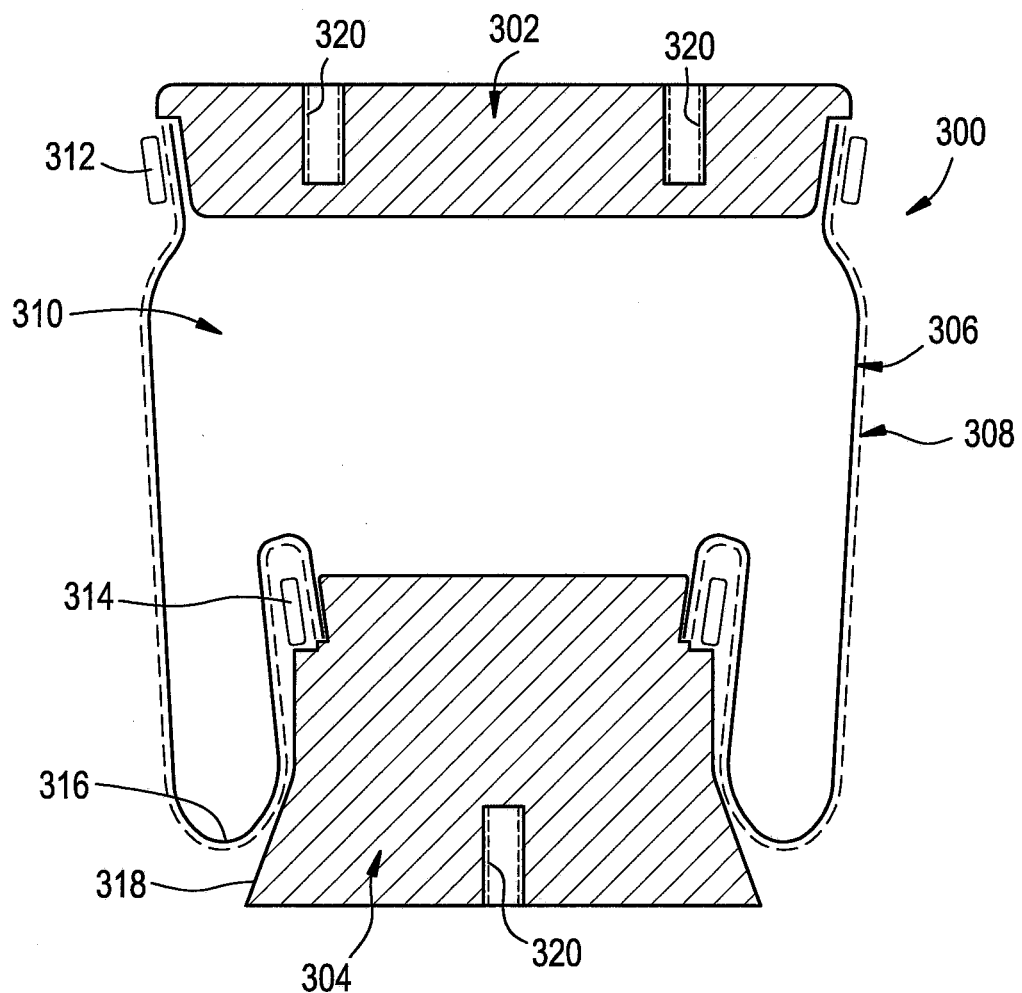
FIG. 11 is a cross-sectional side view of the exemplary gas spring assembly in FIGS. 7-10 shown in a usage or compressed condition.

It will be appreciated that gas spring assembly 300 can be secured on, along or otherwise between associated structural components in any suitable manner and through the use of any number of one or more components and/or devices. As one example, gas spring assembly 300 is shown in FIG. 9 as being disposed between a first or upper structural component USC, such as an associated body 102 of vehicle 100 in FIG. 1, for example, and a second or lower structural component LSC, such as an associated axle 104 of the vehicle 100 in FIG. 1, for example. In some cases, end members 302 and/or 304 can, optionally, include one or more securement features formed therein, such as one or more threaded passages 320, for example, that are dimensioned to receiving only engage a corresponding one or more securement devices, such as one or more threaded fasteners 322, for example. In some cases, one or more holes HLS can extend through upper structural component USC and/or lower structural component LSC. In such cases, the one or more holes can be disposed in approximate alignment with a corresponding one of threaded passages 320 and dimensioned for receipt of one of threaded fasteners 322. It will be appreciated, however, that other configurations and/or arrangements could alternately be used. Additionally, end members 302 and/or 304 can, optionally, include any number of one or more additional features, components and/or elements. For example, end member 304 is shown in FIGS. 7 and 8 as including a transfer passage 324 in fluid communication with spring chamber 310, and adapted to receive and threadably engage an associated connector fitting (not shown), such as may be suitable for forming a substantially fluid tight connection with one of gas transmission lines 128 in FIG. 1, for example.

As described above, an external reinforcing structure in accordance with the subject matter of the present disclosure can extend at least partially around the flexible spring member and assist in restraining outward expansion of the flexible wall thereof in an inflated condition of the gas spring assembly. In a preferred arrangement, the external reinforcing structure can extend along the full length and around the full periphery of the flexible wall. In some cases, the external reinforcing structure can be formed from a plurality of interconnecting wall segments that together at least partially formed a cage, web or screen-like structure having a plurality of openings formed by the interconnecting wall segments. The external reinforcing structure can extend at least partially along and at least partially around the flexible wall. In this manner, the external reinforcing structure can undergo axial and/or lateral displacement as the flexible spring member and the gas spring assembly are extended and compressed, such as may occur during use in operation, for example.

As one example of a suitable construction, external reinforcing structure 308 can include a plurality of interconnecting wall segments and/or wall sections. In the arrangement shown, external reinforcing structure 308 includes mounting wall segments 326 disposed along the opposing ends of the external reinforcing structure. Additionally, a plurality of web or bridge wall segments extends between and operatively interconnects the mounting wall segments. In the arrangement shown, the plurality of bridge wall segments include a plurality of longitudinal wall segments 328 that extend lengthwise between mounting wall segments 326. And, the plurality of bridge wall segments include a plurality of radial wall segments 330 that extend between and operatively interconnect longitudinal wall segments 328 such that a cage, web or screen-like structure is formed.

It will be appreciated that the longitudinal and radial wall segments can be disposed in any suitable orientation, configuration and/or arrangement, such as by being approximately evenly spaced from one another, for example. Additionally, the longitudinal and radial wall segments can be of any suitable size, shape and/or configuration. For example, longitudinal wall segments 328 are shown as extending approximately linearly between mounting wall segment 326 and as being oriented in approximate alignment with axis AX. It will be recognized and appreciated that in some arrangements flexible spring member 306 and external reinforcing structure 308 can have a frustoconical or otherwise tapered overall shape in an extended condition, such as is shown in at least FIGS. 7, 9 and 10, for example. As such, in some cases, the two mounting wall segments can be of two different sizes and/or cross-sectional dimensions. Additionally, longitudinal wall segments 328 can extend inwardly at an angle from one of the mounting wall segments toward the other mounting wall segment. Furthermore, radial wall segments 330 can be of differing sizes and/or cross-sectional dimensions, such as may vary with relative position along the tapered overall shape of the external reinforcing structure.

Additionally, it will be appreciated that the relative size and arrangement of mounting wall segments 326, longitudinal wall segments 328 and radial wall segments 330, as shown in FIGS. 7-11, can result in the formation of a plurality of openings 332 within external reinforcing structure 308. As illustrated in FIG. 6 in connection with gas spring assembly 200, the openings can permit controlled expansion of flexible spring member 306 in an inflated condition and during certain conditions of use, such as during jounce conditions, for example. In some cases, portions of the flexible wall can expand outwardly beyond external reinforcing structure 308, such as through openings 332, for example.

Figure 12:
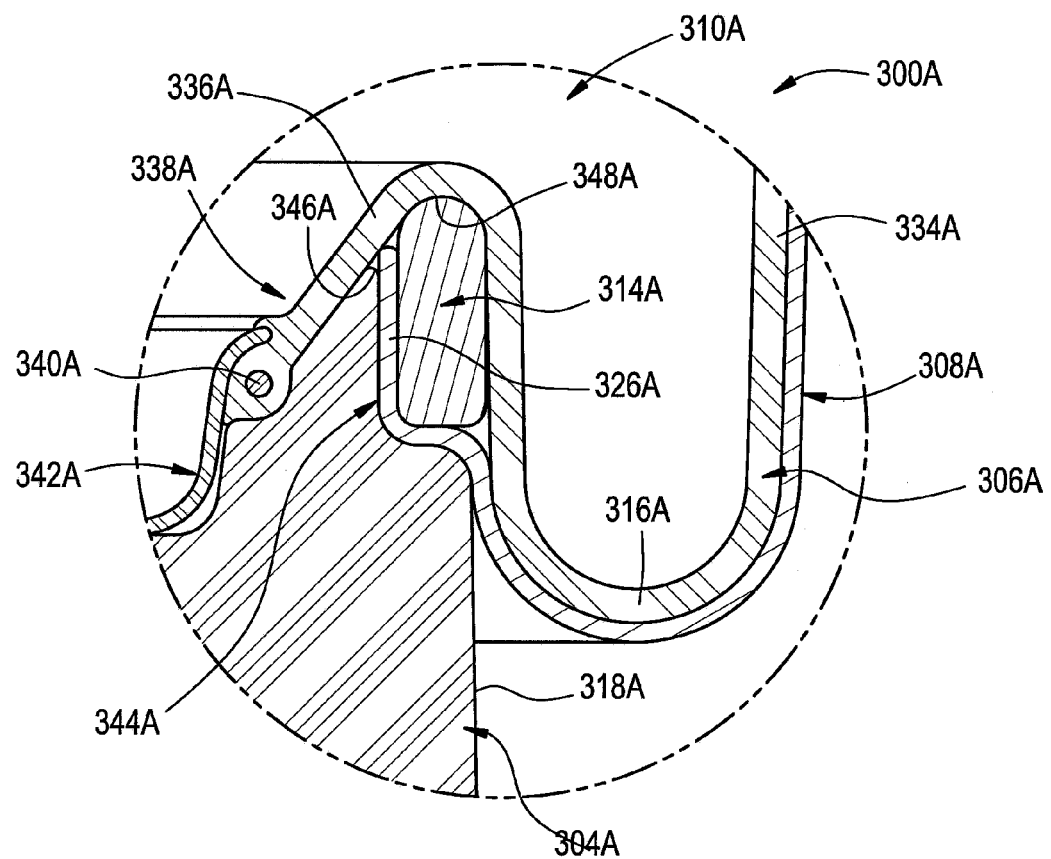
FIG. 12 is an enlarged cross-sectional side view of a portion of an alternate construction of the gas spring assembly in FIGS. 7-11.

Another example of an alternate construction of a gas spring assembly in accordance with the subject matter of the present disclosure is shown in FIG. 12. As a non-limiting example, such an alternate construction could be utilized in connection with one or more of the gas spring assemblies shown and described herein, such as along one or both ends of gas spring assembly 300, for example. FIG. 12 illustrates an alternate construction of one or both ends of a gas spring assembly 300A, which includes an end member 304A in the form of a roll-off piston and a flexible spring member 306A that is secured along the end member. End member 304A and flexible spring member 306A can at least partially define a spring chamber 310A. End member 304A can include an outer surface 318A along which a rolling lobe 316A can be formed and displaced during conventional displacement and use of the gas spring assembly between extended and compressed conditions.

Flexible spring member 306A can include a flexible wall 334A with a wall portion 336A disposed along one end. The flexible spring member can, optionally, include one or more mounting beads 338A formed along an end of the flexible wall, such as adjacent wall portion 336A, for example. In some cases, mounting beads 338A can, optionally, include an annular reinforcing element that is at least partially embedded therein and provides structure such that a robust and substantially fluid-tight connection with the end member can be created and maintained. If provided, such a bead reinforcing element 340A can take any suitable form, such as a polymeric ring or a wound or twisted metal wire ring, for example.

As discussed above, an end of the flexible wall of the flexible spring member can be secured on or along end member 304A in any suitable manner. As one example, an end closure 342A can be secured to end member 304A in a conventional manner. Mounting bead 338A and/or wall portion 336A can be captured between end closure 342A and end member 304A, such as is shown in FIG. 12, for example.

Additionally, as discussed above in connection with gas spring assembly 300, for example, gas spring assembly 300A can include an external reinforcing structure 308A that extends peripherally about flexible spring member 306A and assists in restraining outward expansion of flexible spring member 306A upon inflation and during operation and use of gas spring assembly 300A. The external reinforcing structure can include one or more mounting wall segments 326A, and plurality of bridge wall segments (e.g., wall segments 328 and/or 330) that extend outwardly from mounting wall segment 326A. As mentioned above, the external reinforcing structure(s) can be secured on or along one or more components of the gas spring assembly in any suitable manner. As one example, a portion of the mounting wall segment could be captured and retained between end member 304A and end closure 342A, such as together with mounting bead 338A and/or wall portion 336A of flexible wall 334A, for example.

Alternately, the external reinforcing structure can be secured on or along the end member separately from the flexible spring member. As one example, mounting wall segment 326A can be disposed on or along end member 304A and can be secured thereto in a suitable manner, such as by way of a retaining ring 314A, for example. In some cases, the end member can include a recess, shoulder or seat for receiving and engaging one of more of the mounting wall segment and/or the retaining ring. For example, end member 304A can include a mounting seat 344A that extends axially and radially into the end member and can be dimensioned to receive at least a portion of mounting wall segment 326A and at least a portion of retaining ring 314A, such as is shown in FIG. 12. As discussed above, the retaining ring can compressively engage mounting wall segment 326A to thereby secure the external reinforcing structure on or along end member 304.

It will be appreciated that end member 304A can be of any suitable configuration and/or construction for engaging and retaining flexible spring member 306A and external reinforcing structure 308A on or along the end member. As one example, mounting seat 344A could, in some cases, at least partially define a distal edge or extent 346A of end member 304A, such as is illustrated in FIG. 12, for example. In such cases, retaining ring 314A can include a top or distal edge 348A that is capable of providing a contact surface about which flexible wall 334A can bend to engage external reinforcing structure 308A for displacement along outer surface 318A.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly capable of undergoing displacement between extended and compressed conditions, said gas spring assembly comprising:
    a flexible wall having a longitudinal axis and extending peripherally about said axis and longitudinally between opposing first and second ends displaceable relative to one another between extended and compressed conditions, said flexible wall at least partially defining a spring chamber inflatable by pressurized gas, and said flexible wall being free from internal reinforcement and substantially entirely formed from elastomeric material; and,
    an external reinforcing structure extending peripherally about said axis and lengthwise between opposing first and second ends, said external reinforcing structure positioned along said flexible wall with said first end operatively connected to said first end of said flexible wall and said second end operatively connected to said second end of said flexible wall such that said first and second ends of said external reinforcing structure move relative to one another as said first and second ends of said flexible wall are displaced between said extended and collapsed positions, said external reinforcing structure being at least partially formed from a plurality of wall segments that at least partially define a plurality of openings extending through said reinforcing structure, said external reinforcing structure being at least partially formed from a comparatively inelastic material relative to said flexible wall such that said external reinforcing structure is capable of resisting outward expansion of said flexible wall in an inflated condition thereof;
    said external reinforcing structure including:
        a first section operatively connected to said first end of said flexible wall and including a first connecting wall segment extending peripherally about said axis; and,
        a second section operatively connected to said second end of said flexible wall and including a second connecting wall segment extending peripherally about said axis with said first and second connecting wall segments operatively connected with one another by way of one of a flowed-material joint and a hinge connection.

2. A gas spring assembly according to claim 1 further comprising a first end member extending across said first end of said flexible wall and secured thereto in a substantially fluid-tight manner.

3. A gas spring assembly according to claim 2, wherein said first end of said flexible wall and said first end of said external reinforcing structure are secured to said first end member.

4. A gas spring assembly according to claim 2 further comprising a second end member extending across said second end of said flexible wall and secured thereto in a substantially fluid-tight manner.

5. A gas spring assembly according to claim 4, wherein said second end of said flexible wall and said second end of said external reinforcing structure are secured to said second end member.

6. A gas spring assembly according to claim 2, wherein said first end member is one of an end cap, a bead plate and a roll-off piston.

7. A gas spring assembly according to claim 2, wherein said first end member includes an end wall portion and a side wall portion projecting axially from along said end wall portion, said side wall portion having an outer peripheral surface, said first end of said flexible wall being disposed along said outer peripheral surface of said side wall portion, and said first end of said external reinforcing structure being disposed along said first end of said flexible wall.

8. A gas spring assembly according to claim 7 further comprising a retaining ring secured in abutting engagement along said first end of said external reinforcing structure such that said first end of said external reinforcing structure and said first end of said flexible wall are compressively secured along said outer peripheral surface of said first end member.

9. A gas spring assembly according to claim 2, wherein said first end member includes an end wall portion and an outer peripheral wall portion, said first end of said external reinforcing structure being disposed radially inward of and in abutting engagement with said outer peripheral portion of said first end member, and said first end of said flexible wall being disposed radially inward of and in abutting engagement with said first end of said external reinforcing structure.

10. A gas spring assembly according to claim 9, wherein said flexible wall includes a mounting bead formed along said first end thereof, and said mounting bead and at least a portion of said first end of said external reinforcing structure are compressively captured by said outer peripheral wall portion of said first end member.

11. A gas spring assembly according to claim 2, wherein said first end member includes an outer side surface and said flexible wall forms a rolling-lobe that is displaceable along said outer side surface as said gas spring assembly undergoes displacement between extended and compressed conditions.

12. A gas spring assembly according to claim 1, wherein said external reinforcing structure includes a first mounting wall segment disposed along said first end and secured in abutting engagement with said first end of said flexible wall.

13. A gas spring assembly according to claim 12, wherein said external reinforcing structure includes a second mounting wall segment disposed along said second end and secured in abutting engagement with said second end of said flexible wall.

14. A gas spring assembly according to claim 13, wherein said first and second mounting wall segments extend peripherally about said axis, and said external reinforcing structure includes a plurality of bridge wall segments that extend between and operatively interconnect said first and second mounting wall segments.

15. A gas spring assembly according to claim 14, wherein said plurality of bridge wall segments includes at least one of one or more longitudinally-extending bridge wall segments and one or more radially-extending bridge wall segments.

16. A gas spring assembly dimensioned for securement between associated structural components and displaceable between extended and collapsed positions, said gas spring assembly comprising:
an elongated flexible wall having a longitudinal axis and extending peripherally about said longitudinal axis and longitudinally between opposing first and second ends such that said flexible wall can at least partially define a spring chamber for retaining a quantity of pressurized gas, said flexible wall at least partially formed from a quantity of elastomeric material;
a first end member extending across said first end of said flexible wall and secured thereto in a substantially fluid-tight manner;
a second end member extending across said second end of said flexible wall and secured thereto in a substantially fluid-tight manner; and,
an external reinforcing structure extending peripherally about said axis and longitudinally between opposing first and second ends, said external reinforcing structure disposed peripherally around and longitudinally along said flexible wall with said first end operatively connected to said first end member and said second end operatively connected to said second end member such that said first and second ends of said external reinforcing structure move relative to one another as said gas spring assembly undergoes displacement between said extended and collapsed positions, and said external reinforcing structure at least partially formed from a plurality of wall segments that at least partially define a plurality of openings extending through said reinforcing structure, said external reinforcing structure being at least partially formed from a comparatively inelastic material relative to said flexible wall such that said external reinforcing structure is capable of resisting outward expansion of said flexible wall in an inflated condition of said gas spring assembly;
said external reinforcing structure including:
a first section operatively connected to said first end of said flexible wall and including a first connecting wall segment extending peripherally about said axis; and,
a second section operatively connected to said second end of said flexible wall and including a second connecting wall segment extending peripherally about said axis with said first and second connecting wall segments operatively connected with one another by way of one of a flowed-material joint and a hinge connection.

17. A gas spring assembly displaceable between extended and collapsed positions, said gas spring assembly comprising:
a flexible wall having a longitudinal axis and extending peripherally about said axis and longitudinally between opposing first and second ends, said flexible wall at least partially defining a spring chamber, said flexible wall being free from internal reinforcement and substantially entirely formed from a quantity of elastomeric material;
a first end member secured across said first end of said flexible wall in a substantially fluid-tight manner;
a second end member secured across said second end of said flexible wall in a substantially fluid-tight manner; and,
an external reinforcing structure extending peripherally about said axis and longitudinally between opposing first and second ends, said external reinforcing structure positioned along said flexible wall with said first end operatively connected to said first end member and said second end operatively connected to said second end member such that said external reinforcing structure extends and collapses as said gas spring assembly undergoes displacement between said extended and collapsed positions, said external reinforcing structure being at least partially formed from a comparatively inelastic material relative to said flexible wall such that said external reinforcing structure is capable of resisting outward expansion of said flexible wall in an inflated condition of said gas spring assembly;

said external reinforcing structure including:
  a first section operatively connected to said first end of said flexible wall and including a first connecting wall segment extending peripherally about said axis; and,
a second section operatively connected to said second end of said flexible wall and including a second connecting wall segment extending peripherally about said axis with said first and second connecting wall segments operatively connected with one another by way of one of a flowed-material joint and a hinge connection.

* * * * *